United States Patent
Alayoub

(10) Patent No.: US 9,483,961 B1
(45) Date of Patent: Nov. 1, 2016

(54) WATER CONSERVATION EDUCATIONAL MAT AND KIT

(71) Applicant: Ayoub Khaled Alayoub, Mishrif (KW)

(72) Inventor: Ayoub Khaled Alayoub, Mishrif (KW)

( * ) Notice: Subject to any disclaimer, the term of this patent is extended or adjusted under 35 U.S.C. 154(b) by 0 days.

(21) Appl. No.: 15/219,152

(22) Filed: Jul. 25, 2016

(51) Int. Cl.
| | |
|---|---|
| *G09B 9/00* | (2006.01) |
| *G09B 25/08* | (2006.01) |
| *G09B 29/12* | (2006.01) |
| *G09B 29/00* | (2006.01) |
| *G09B 23/40* | (2006.01) |

(52) U.S. Cl.
CPC .............. *G09B 25/08* (2013.01); *G09B 23/40* (2013.01); *G09B 29/006* (2013.01); *G09B 29/12* (2013.01)

(58) Field of Classification Search
USPC ....... 434/126, 130, 150, 152, 236, 276, 299; 273/113–116; 446/153, 176
See application file for complete search history.

(56) References Cited

U.S. PATENT DOCUMENTS

| | | | | | |
|---|---|---|---|---|---|
| 3,475,834 | A | * | 11/1969 | Bugg | E02B 1/02 434/126 |
| 3,541,705 | A | * | 11/1970 | Nelson | G09B 23/12 353/44 |
| 5,326,267 | A | * | 7/1994 | Brokaw | G09B 25/06 273/241 |
| 5,427,530 | A | * | 6/1995 | Taggart | G09B 19/0061 434/150 |
| 5,653,592 | A | * | 8/1997 | Davinroy | G09B 25/08 434/126 |
| 5,971,764 | A | * | 10/1999 | Todd | G09B 25/08 434/126 |
| 6,129,635 | A | * | 10/2000 | Kuo | A63G 31/00 244/155 R |
| 6,254,101 | B1 | | 7/2001 | Young | |
| 6,378,871 | B1 | | 4/2002 | Roberts | |
| 6,554,277 | B1 | * | 4/2003 | Descamps | A63B 21/0088 273/109 |
| 6,607,418 | B2 | * | 8/2003 | Henry | A63H 33/32 434/126 |
| 6,866,269 | B2 | * | 3/2005 | Liebau | A63B 21/0088 273/440 |
| 7,270,327 | B1 | * | 9/2007 | Hsu | A63B 21/0004 273/109 |
| 7,722,042 | B2 | * | 5/2010 | Cross | A63F 7/3603 273/109 |
| 8,043,094 | B2 | * | 10/2011 | Bahler | G09B 25/025 434/150 |
| 8,662,899 | B1 | | 3/2014 | Alayoub | |
| 9,039,420 | B1 | | 5/2015 | Alayoub | |
| 2003/0039946 | A1 | | 2/2003 | Roberts | |
| 2012/0216875 | A1 | | 8/2012 | Szydlowski et al. | |
| 2013/0160997 | A1 | | 6/2013 | Punthakey | |

FOREIGN PATENT DOCUMENTS

FR          2653256 A1      4/1991

* cited by examiner

*Primary Examiner* — Kurt Fernstrom
(74) *Attorney, Agent, or Firm* — Richard C. Litman

(57) ABSTRACT

The water conservation educational mat includes a water-impermeable and flexible sheet, having opposed top and bottom surfaces, and with a plurality of first openings and a plurality of apertures being formed therethrough. A plurality of flexible reservoirs are respectively received by, and seal, the plurality of first openings. In use, a volume of water may be received within one of the plurality of flexible reservoirs and users may manipulate the water-impermeable and flexible sheet to cause the volume of water to flow from one of the plurality of flexible reservoirs to another one of the plurality of flexible reservoirs. The plurality of apertures serve as obstacles to be avoided during water transfer.

10 Claims, 5 Drawing Sheets

WATER CONSERVATION EDUCATIONAL MAT AND KIT

BACKGROUND OF THE INVENTION

1. Field of the Invention

The present invention relates to educational devices and tools, and particularly to a water conservation educational mat and kit for teaching interactive lessons related to water conservation principles.

2. Description of the Related Art

Management of fresh water as a sustainable resource, protection of the water environment, and meeting current and future human demands for fresh water are each particularly important to the human population in light of both exponential population growth and global climate change. A wide variety of educational and informative programs exist around the world for promoting water conservation, with a particular emphasis on ensuring availability of water for future generations where the withdrawal of fresh water from an ecosystem does not exceed its natural replacement rate.

Although the broad concepts and goals of water conversation are relatively easy to convey on a purely informational and abstract level to adults, it is difficult to provide "real world" training on water conservation principles. Additionally, training programs and material are typically aimed at home and business owners, high school and college-level students, and people working in water-related industries. It is often difficult to teach the same principles and information to children. Thus, a water conservation educational mat and kit addressing the aforementioned problems is desired.

SUMMARY OF THE INVENTION

The water conservation educational mat includes a water-impermeable and flexible sheet, having opposed top and bottom surfaces, a plurality of first openings, and a plurality of apertures extending through the flexible sheet. A plurality of flexible reservoirs are respectively received by, and seal, the plurality of first openings. In use, a volume of water may be received within one of the plurality of flexible reservoirs and users may manipulate the water-impermeable and flexible sheet to cause the volume of water to flow to another one of the plurality of flexible reservoirs. The plurality of apertures serve as obstacles to be avoided during water transfer, to aid in teaching the difficulties of water transfer from one location to another. As multiple users are required to manipulate the mat to transfer the water, the water conservation educational mat also reinforces the notion that water conservation requires a team effort.

The plurality of apertures may be divided into a plurality of sets of apertures distributed over the surface of the water-impermeable and flexible sheet. Additional obstacles to the transfer of water may also be included, such as a first net extending across a recess defined in the water-impermeable and flexible sheet, and at least one second net extending across at least one second opening formed through the water-impermeable and flexible sheet.

Preferably, each flexible reservoir has a sealable port formed therethrough. At least one tube can be provided for connecting the sealable ports of a selected pair of the plurality of flexible reservoirs, allowing water to be transferred by alternative routes; i.e., through tubes secured to one or more sides of the water-impermeable and flexible sheet.

The water conservation educational mat is preferably provided as part of a kit, including the water conservation educational mat, a plurality of tubes for the interconnection of selected pairs of the flexible reservoirs, and a plurality of bowls for receiving balls or the like. In learning environments where spilled water may be a concern, the water used with the water conservation educational mat may be replaced by bowls which are received within the flexible reservoirs. The bowls may be used to hold balls or the like, which serve as a dry substitute for teaching water conservation principles. Alternatively, the bowls can be used for holding varying volumes of water, dependent upon the particular educational lessons and games.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
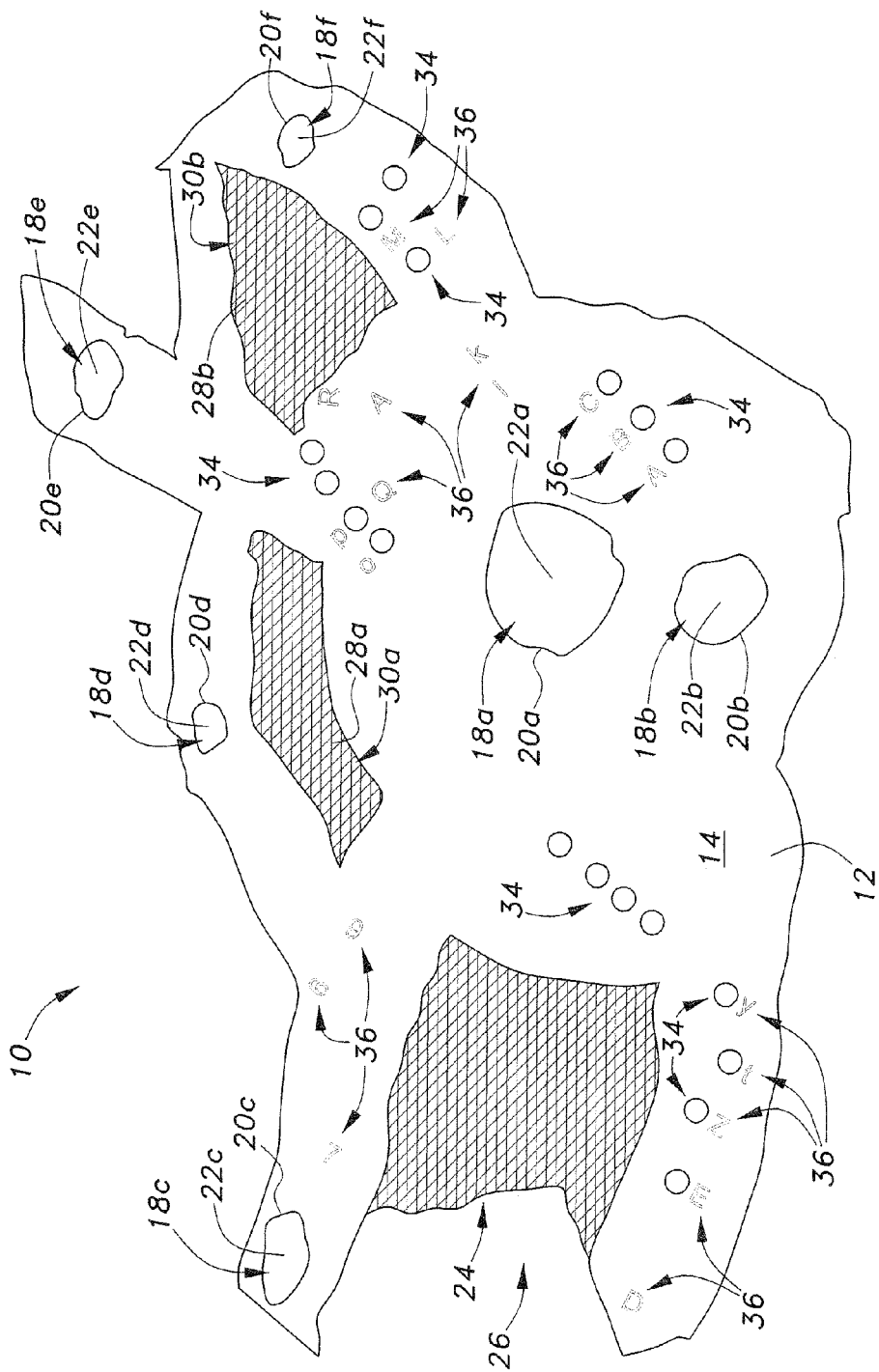
FIG. 1 is a top view of a water conservation educational mat according to the present invention.
Figure 2:
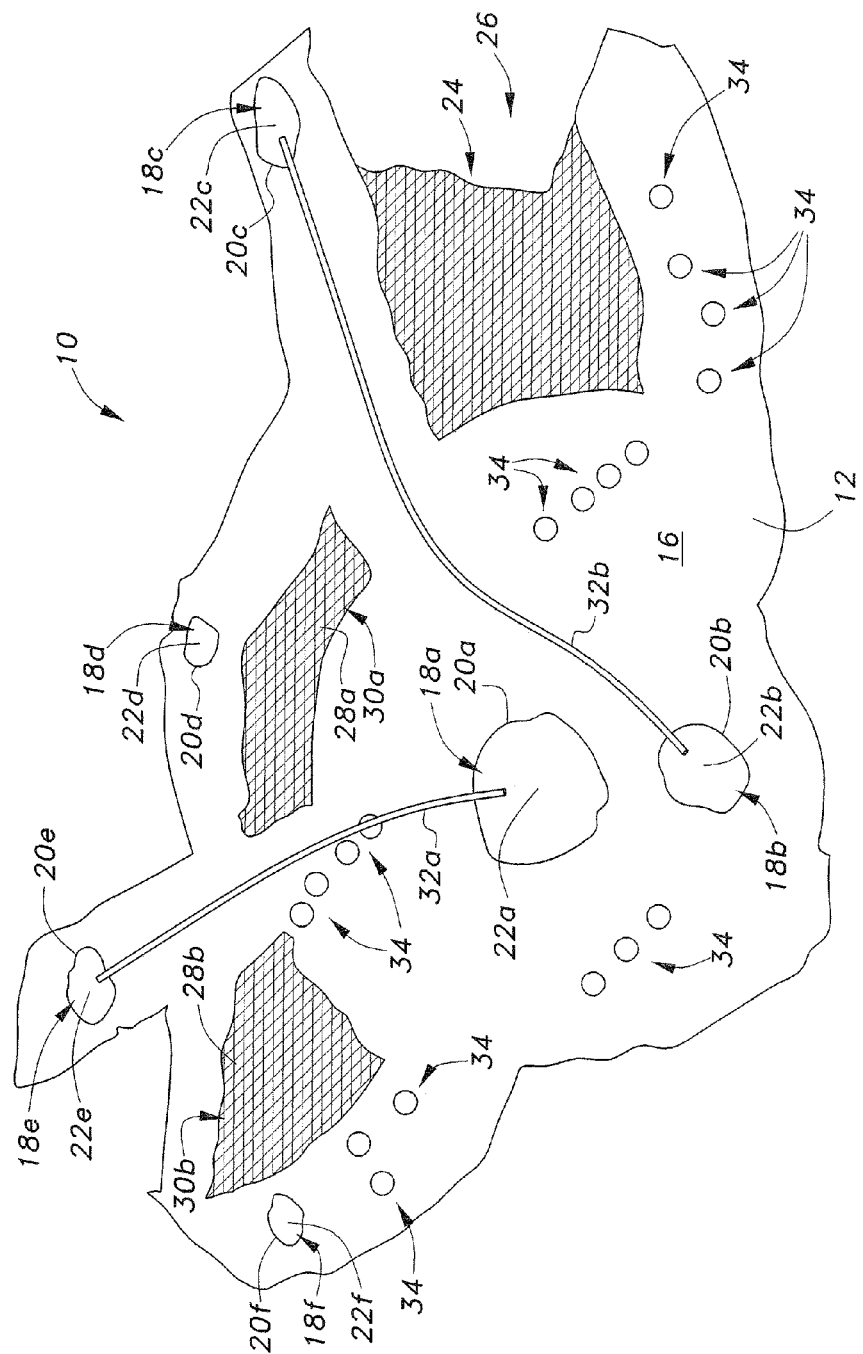
FIG. 2 is a bottom view of the water conservation educational mat according to the present invention.

Referring now to FIGS. 1 and 2, the water conservation educational mat 10 includes a water-impermeable and flexible sheet 12, having opposed top and bottom surfaces, 14, 16, respectively, and with a plurality of first openings 18a, 18b, 18c, 18d, 18e and 18f, and a plurality of apertures 34 formed therethrough. A plurality of flexible reservoirs 20a, 20b, 20c, 20d, 20e and 20f are respectively received by, and seal, the plurality of first openings 18a, 18b, 18c, 18d, 18e and 18f. In FIGS. 1 and 2, the water-impermeable and flexible sheet 12 is shown with an overall contour resembling a turtle, however it should be understood that the water-impermeable and flexible sheet 12 may have any desired overall contouring, dependent upon the intended audience for receiving water conservation educational training, as well as the games and/or lessons chosen to be used with the water conservation educational mat 10. Similarly, the particular positioning of the flexible reservoirs 20a, 20b, 20c, 20d, 20e and 20f with respect to water-impermeable and flexible sheet 12, and their respective sizes, are shown for exemplary purposes only, and may also be varied dependent upon the intended audience for receiving water conservation educational training, as well as the games and/or lessons chosen to be used with the water conservation educational mat 10.

Figure 3:
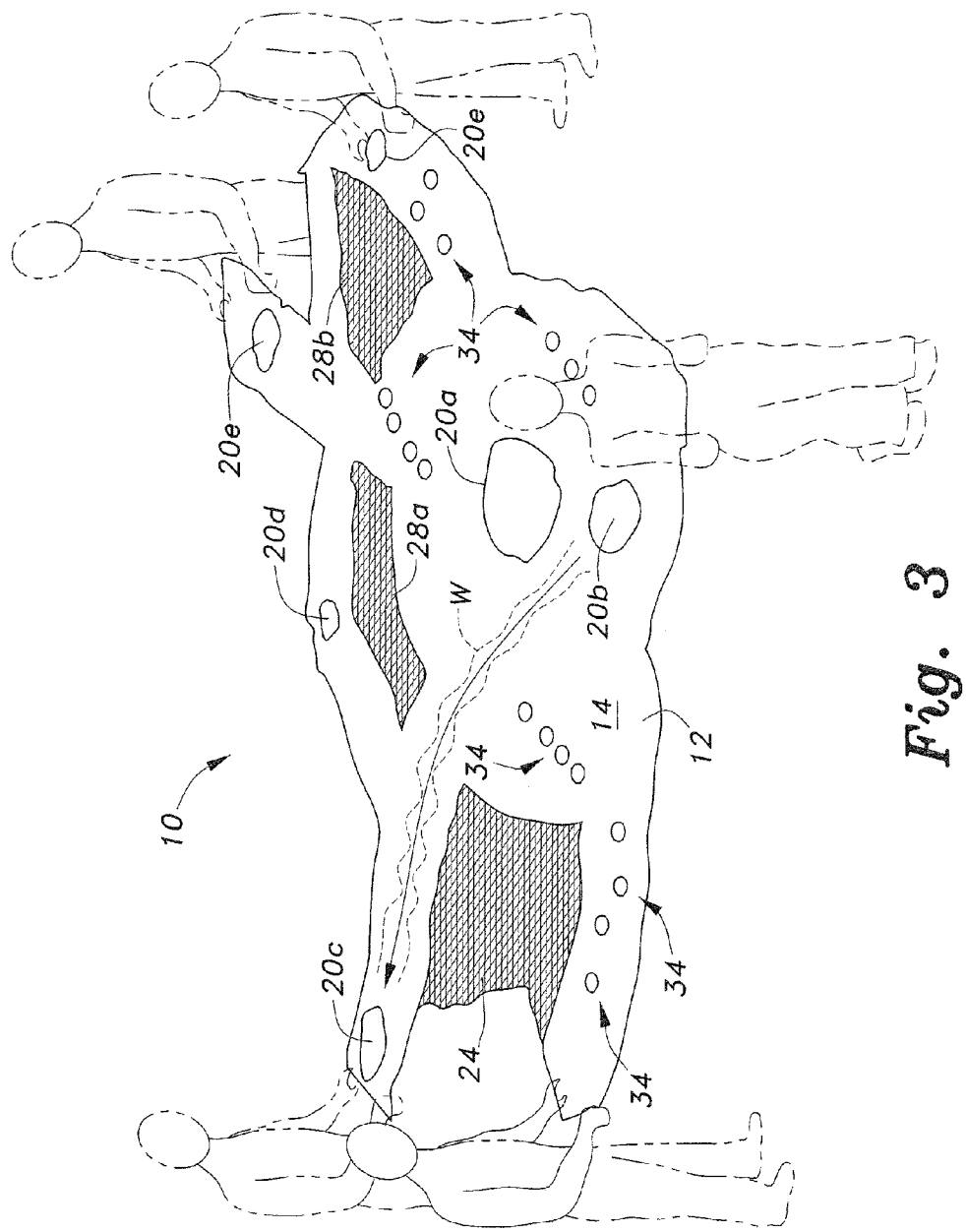
FIG. 3 illustrates the water conservation educational mat in use for teaching a group of users about water conservation principles.

In use, as shown in FIG. 3, a volume of water W may be received within one of the flexible reservoirs (with reservoir 20b being used in the example of FIG. 3) and users may manipulate the water-impermeable and flexible sheet 12 to cause the volume of water W to flow to another one of the plurality of flexible reservoirs (reservoir 20c in the example of FIG. 3). The plurality of apertures 34 serve as obstacles to be avoided, aiding in teaching the difficulties in water transfer from one location to another. Since multiple users are required to manipulate the mat to transfer the water, the water conservation educational mat 10 also reinforces the notion that water conservation requires a team effort. Each of the flexible reservoirs 20a, 20b, 20c, 20d, 20e and 20f may, for example, represent individuals, groups, tents, houses, villages, cities or countries during training.

Although FIG. 3 illustrates only a single example of how the water conservation educational mat 10 may be used (additional examples are described below) to enhance public awareness of water issues in the world, as well as raise the awareness of water savings in societies, regardless of water scarcity in the users' particular region. In this example, the users must apply critical thinking skills in the field of water conservation and use their creativity in solving water transfer problems and water waste.

As best seen in FIGS. 1 and 2, the plurality of apertures 34 may be divided into a plurality of sets of apertures distributed over the surface of the water-impermeable and flexible sheet 12, however it should be understood that the division and distribution of apertures 34 is shown for exemplary purposes only, and may be varied dependent upon the particular games and/or lessons chosen to be used with the water conservation educational mat 10.

Further, as best shown in FIG. 1, indicia 36 may be added to the top surface 14 of sheet 12. In FIG. 1, the indicia 36 are shown in the form of letters and numbers distributed on various portions of top surface 14. However, as with the other features of the water conservation educational mat 10, it should be understood that indicia 36 are shown for exemplary purposes only, and may be varied dependent upon the intended audience for receiving water conservation educational training, as well as the games and/or lessons chosen to be used with the water conservation educational mat 10. For example, the indicia 36 may be used as markers or indicators for the users in plotting and planning water transfer routes, as well as providing borders and barriers for teaching such principles as water pollution and waste of water.

Additional obstacles to the transfer of water W may also be included, such as a first net 24 extending across a recess 26 defined in a side edge of the water-impermeable and flexible sheet 12, and at least one second net extending across at least one second opening formed through the water-impermeable and flexible sheet. In FIGS. 1 and 2, two such nets 28a, 28b are shown extending across second openings 30a, 30b, respectively, however it should be understood that nets 24, 28a, 28b, as well as recess 26 and openings 30a, 30b, are shown for exemplary purposes only, and that their number, overall contouring, relative dimensions and positioning with respect to sheet 12 may be varied dependent upon the games and/or lessons chosen to be used with the water conservation educational mat 10.

Preferably, each flexible reservoir 20a, 20b, 20c, 20d, 20e and 20f has a corresponding sealable port 22a, 22b, 22c, 22d, 22e and 22f formed therethrough. At least one tube is provided for connecting the sealable ports of a selected pair of the plurality of flexible reservoirs, allowing water to be transferred by alternative routes; i.e., through tubes secured on the underside of the water-impermeable and flexible sheet 12. In the example of FIG. 2, tube 32a provides fluid communication between sealable port 22a of flexible reservoir 20a and sealable port 22e of flexible reservoir 20e. Similarly, tube 32b provides fluid communication between sealable port 22b of flexible reservoir 20b and sealable port 22c of flexible reservoir 20c. It should be understood that the selection of these two pairs of flexible reservoirs, and the usage of only two tubes, is shown for exemplary purposes only. By using the tubes to teach water transfer (as opposed to the first example of FIG. 3), the users are taught the basic principles of water networking. By imagining different borders and boundaries, the users must also apply critical thinking skills and creativity to the problem of water sharing and/or transfer between different regions.

Figure 4:
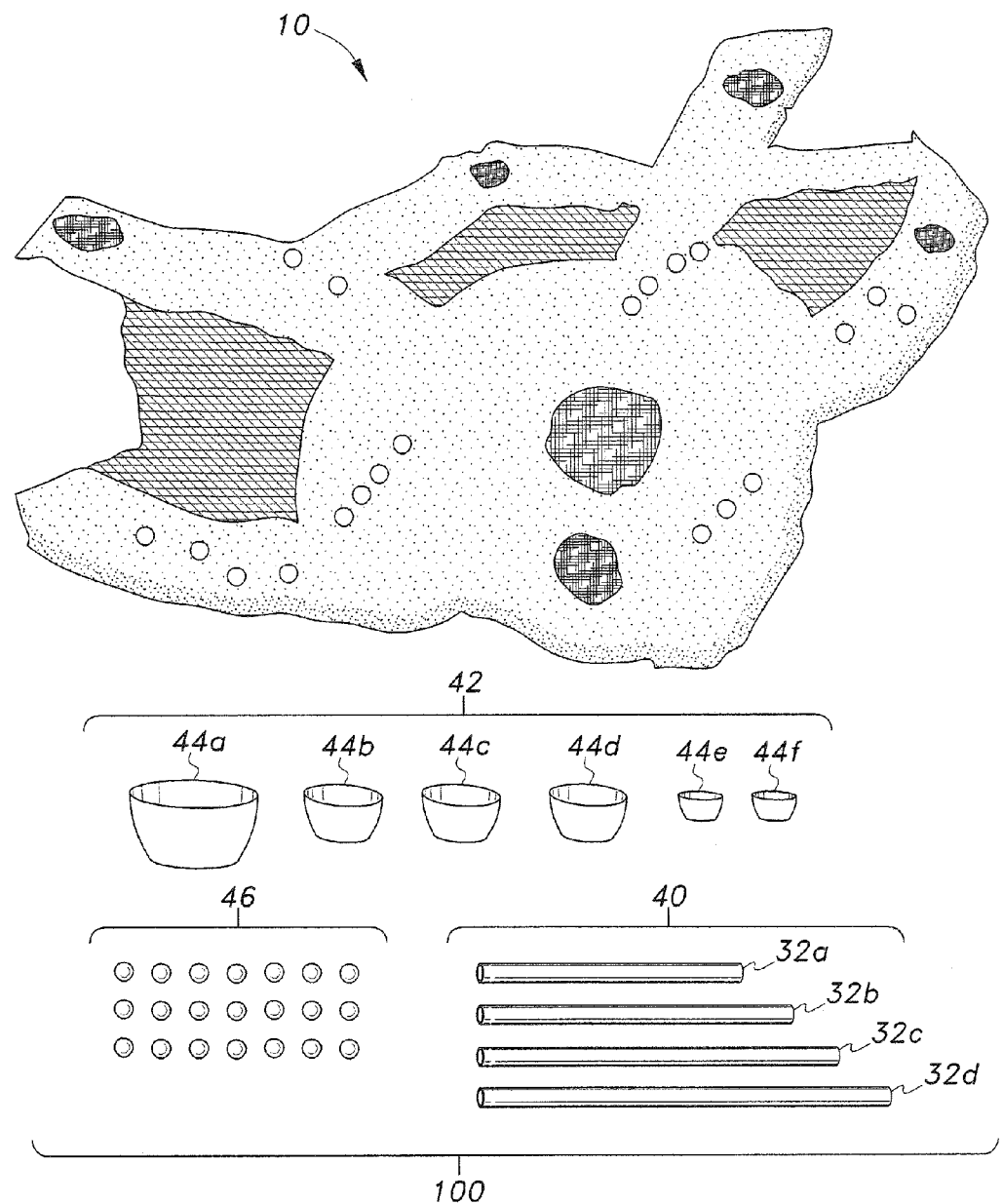
FIG. 4 is a perspective view of a water conservation educational kit including the water conservation educational mat.
Figure 5:
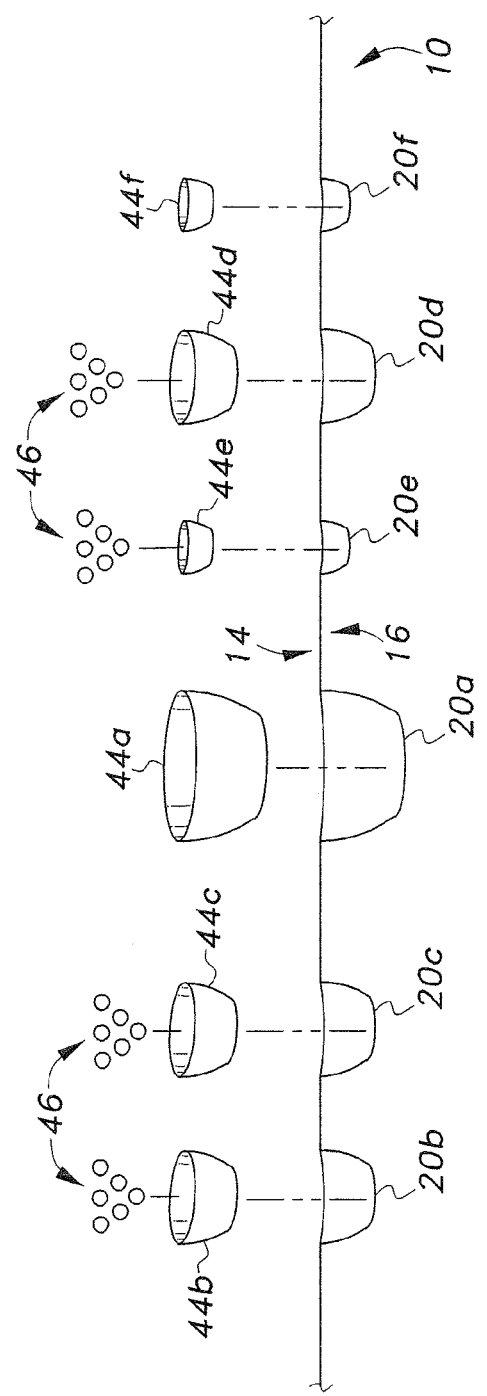
FIG. 5 is a side view of an alternative educational usage of the water conservation educational kit.

As illustrated in FIG. 4, the water conservation educational mat 10 is preferably provided as part of a kit 100, including the water conservation educational mat 10, a plurality of tubes 32a, 32b, 32c and 32d (included in set 40) for the interconnection of selected pairs of the flexible reservoirs 20a, 20b, 20c, 20d, 20e and 20f, and a plurality of bowls 44a, 44b, 44c, 44d, 44e and 44f (included in set 42) for receiving balls 46 or the like. As illustrated in FIG. 5, in learning environments in which spilled water may be a concern, the water used with the water conservation educational mat 10 may be replaced by bowls 44a, 44b, 44c, 44d, 44e and 44f, which are respectively received within the flexible reservoirs 20a, 20b, 20c, 20d, 20e and 20f. The bowls 44a, 44b, 44c, 44d, 44e and 44f may be used to hold balls 46 or the like, which serve as a dry substitute for water in teaching water conservation principles. Alternatively, the bowls 44a, 44b, 44c, 44d, 44e and 44f can be used for holding varying volumes of water, dependent upon the particular educational lessons and games selected.

It should be understood that the usage of the water conservation educational mat 10 (and kit 100) is not limited solely to the examples provided above. As an educational tool, it may be used as part of a wide variety of different lessons, and in a wide variety of different training exercises and educational games. In addition to teaching water conservation principles, the water conservation educational mat 10 (and kit 100) may be used to teach other educational principles. For example, the water W may also represent time and flexible reservoirs 20a, 20b, 20c, 20d, 20e and 20f may represent priorities, projects or tasks, thus allowing the educational mat 10 to be used to help people evaluate how they spend their time and focus on the causes of time waste (both individual and organizational). The same teaching principles may also be applied to various types of resources, such as budgets, money, abilities, skill sets, organizational resources and the like. The opportunities for different lessons, and the various elements of kit 100 may be used to represent a wide variety of different principles, resources and the like. For example, when using balls 46, particular ball sizes may be used to represent quantity and particular colors may be used to represent quality.

It is to be understood that the present invention is not limited to the embodiments described above, but encompasses any and all embodiments within the scope of the following claims.

I claim:

1. A water conservation educational mat, comprising:
a water-impermeable and flexible sheet having opposed top and bottom surfaces, a plurality of first openings and a plurality of apertures being formed therethrough; and
a plurality of flexible reservoirs respectively received by and sealing the plurality of first openings,
whereby a volume of water may be received within one of the plurality of flexible reservoirs and users may manipulate the water-impermeable and flexible sheet to cause the volume of water to flow to another one of the plurality of flexible reservoirs.

2. The water conservation educational mat as recited in claim 1, further comprising a first net extending across a recess defined in the water-impermeable and flexible sheet.

3. The water conservation educational mat as recited in claim 1, further comprising at least one second net extending across at least one second opening formed through the water-impermeable and flexible sheet.

4. The water conservation educational mat as recited in claim 1, wherein each said flexible reservoir has a sealable port formed therethrough.

5. The water conservation educational mat as recited in claim 4, further comprising at least one tube for providing fluid communication between a selected pair of the plurality of flexible reservoirs.

6. The water conservation educational mat as recited in claim 1, wherein the plurality of apertures comprise a plurality of sets of apertures distributed over the water-impermeable and flexible sheet.

7. A water conservation educational kit, comprising:
   an educational mat comprising:
     a water-impermeable and flexible sheet having opposed top and bottom surfaces, a plurality of first openings and a plurality of apertures being formed therethrough; and
     a plurality of flexible reservoirs respectively received by and sealing the plurality of first openings, each said flexible reservoir having a sealable port formed therethrough;
   a plurality of tubes for selectively providing fluid communication for selected pairs of the plurality of flexible reservoirs;
   a plurality of bowls adapted to be selectively received within the plurality of flexible reservoirs; and
   a plurality of balls.

8. The water conservation educational kit as recited in claim 7, further comprising a first net extending across a recess defined in the water-impermeable and flexible sheet.

9. The water conservation educational kit as recited in claim 7, further comprising at least one second net extending across at least one second opening formed through the water-impermeable and flexible sheet.

10. The water conservation educational kit as recited in claim 7, wherein the plurality of apertures comprise a plurality of sets of apertures distributed over the water-impermeable and flexible sheet.

* * * * *